(12) United States Patent
Zhang et al.

(10) Patent No.: US 12,102,960 B2
(45) Date of Patent: Oct. 1, 2024

(54) PLASMA PURIFICATION DEVICE FOR PURIFYING CATERING OIL FUME AND METHOD FOR PURIFYING CATERING OIL FUME

(71) Applicant: SUZHOU UNIVERSITY OF SCIENCE AND TECHNOLOGY, Jiangsu (CN)

(72) Inventors: Xing Zhang, Jiangsu (CN); Yubin Chi, Jiangsu (CN)

(73) Assignee: SUZHOU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/565,368

(22) PCT Filed: Jul. 19, 2023

(86) PCT No.: PCT/CN2023/108036
§ 371 (c)(1),
(2) Date: Nov. 29, 2023

(87) PCT Pub. No.: WO2024/017273
PCT Pub. Date: Jan. 25, 2024

(65) Prior Publication Data
US 2024/0261723 A1 Aug. 8, 2024

(30) Foreign Application Priority Data
Jul. 22, 2022 (CN) .......................... 202210867567.3

(51) Int. Cl.
*B01D 53/32* (2006.01)
*B01D 53/86* (2006.01)
(Continued)

(52) U.S. Cl.
CPC ......... *B01D 53/32* (2013.01); *B01D 53/8687* (2013.01); *B01D 2257/708* (2013.01); *B01D 2258/0275* (2013.01); *B01D 2259/818* (2013.01)

(58) Field of Classification Search
CPC .. B03C 3/10; B03C 3/14; B03C 3/145; B03C 3/15; B03C 3/41; B03C 2201/06;
(Continued)

(56) References Cited

U.S. PATENT DOCUMENTS 3,890,103 A * 6/1975 Konishi .................. B03C 3/017
96/48
4,185,971 A * 1/1980 Isahaya .................. B03C 3/743
55/296
(Continued)

FOREIGN PATENT DOCUMENTS

CN 102958264 A 3/2013
CN 103566753 A 2/2014
(Continued)

*Primary Examiner* — Christopher P Jones
*Assistant Examiner* — Sonji Turner

(57) ABSTRACT

The present disclosure discloses a plasma purification device for purifying catering oil fume and a method for purifying catering oil fume, relating to the technical field of atmospheric pollution control. The plasma purification device successively includes in a flow direction of airflow an inlet, a rotary discharge module configured to negatively charge oil fume particulate matter with a particle size between 2 μm and 50 μm in the catering oil fume; an electrostatic adsorption module configured to capture negatively charged oil fume particulate matter; a back corona catalytic module configured to treat VOCs in the catering oil fume; and an outlet. The rotary discharge module includes a central rod arranged parallel to the flow direction of airflow and a plurality of barbed corona electrodes arranged around the central rod.

6 Claims, 1 Drawing Sheet

(51) Int. Cl.
*B03C 3/14* (2006.01)
*B03C 3/38* (2006.01)
*B03C 3/41* (2006.01)
*B03C 3/45* (2006.01)
*B03C 3/78* (2006.01)

(58) Field of Classification Search
CPC ... B03C 2201/08; B03C 2201/10; B03C 3/12; B03C 3/363; B03C 3/38; B03C 3/47; B03C 3/78; B03C 3/82; B03C 3/86; B03C 3/88; B03C 3/017; B03C 3/011; B03C 3/36; B03C 3/361; B03C 3/74; B01D 53/32; B01D 53/8687; B01D 2257/708; B01D 2258/0275; B01D 2259/818
See application file for complete search history.

(56) References Cited

U.S. PATENT DOCUMENTS

2003/0217642 A1    11/2003  Pasic et al.
2008/0170971 A1     7/2008  Bergeron et al.
2021/0402413 A1*   12/2021  Kim .................... B03C 3/41

FOREIGN PATENT DOCUMENTS

| CN | 203577636 U | 5/2014 | |
|---|---|---|---|
| CN | 104174279 A | 12/2014 | |
| CN | 104501311 A | 4/2015 | |
| CN | 106765566 A | 5/2017 | |
| CN | 115430267 A | 12/2022 | |
| CN | 116586191 A | 8/2023 | |
| KR | 20100011438 A | 2/2010 | |
| KR | 102060432 * | 12/2019 | ............. F24F 11/63 |
| WO | WO-2020184912 A1 * | 9/2020 | ............. B01D 47/06 |
| WO | 2022007297 A1 | 1/2022 | |

* cited by examiner

PLASMA PURIFICATION DEVICE FOR PURIFYING CATERING OIL FUME AND METHOD FOR PURIFYING CATERING OIL FUME

CROSS-REFERENCE TO RELATED APPLICATION

This application claims priority to Chinese Patent Application No. 202210867567.3, entitled "Plasma Purification Device For Purifying Catering Oil Fume And Method For Purifying Catering Oil Fume" and filed on Jul. 22, 2022, in the National Intellectual Property Administration of China, the whole disclosure of which is incorporated herein by reference.

TECHNICAL FIELD

The present disclosure relates to the technical field of atmospheric pollution control, especially to a plasma purification device for purifying catering oil fume and a method for purifying catering oil fume.

DESCRIPTION OF THE RELATED ART

Catering oil fume refers to a three-phase mixture of solid, liquid, and gas produced during the food cooking and food processing, and includes solid particles and liquid oil droplets, as well as volatile organic compounds (VOCs) like alkanes, alcohols, aldehyde ketones, heterocyclic amines, and polycyclic aromatic hydrocarbons. The emission of catering oil fume is characterized by its large volume, wide distribution, and dispersion. The catering oil fume typically exists in gaseous or aerosol states in the environmental medium. VOCs in the oil fume act as important precursor and participant for PM2.5 and O3, which not only undergo photochemical reaction with SO2, NOX, and the like to form photochemical smog, but also react with strong oxidant in the atmosphere, such as ·OH and O3, to produce secondary organic aerosols (SOAs), causing various environmental effects on regional atmospheric quality. Furthermore, as most VOCs exhibit tri-effects (carcinogenicity, teratogenicity, mutagenicity), their toxicity, persistence, and difficulty in degradation severely harm human health and the human living space.

Aiming at the problem of controlling the catering oil fume pollution, conventional purification techniques are difficult to effectively purify the catering oil fume. Non-equilibrium plasma technology can produce a large number of high-energy electrons, hydroxyl radicals, ozone, and other highly oxidizing active particles at normal temperature and pressure. These can react with VOCs gaseous pollutants in catering oil fume, to degrade them into non-toxic or low-toxic substance with small molecules like CO2 and H2O. This technology has advantages in high purification efficiency, easy operation management, and low energy consumption, etc., and thus is widely used in the field of flue gas purification.

Aiming at the challenge of controlling VOC gaseous pollutants in catering oil fume, the present disclosure, based on plasma technology, provides a plasma purification device for purifying catering oil fume and a method for purifying catering oil fume.

SUMMARY

The technologies for purifying catering oil fume mainly include mechanical separation, filtration and adsorption, electrostatic deposition, and wet scrubbing. Among them, electrostatic deposition has a higher purification efficiency compared to other techniques and can effectively remove solid particulate matter and liquid oil droplet in catering oil fume. However, electrostatic deposition cannot control VOCs gaseous pollutants, causing secondary pollution to the environment. Moreover, the existing catering oil fume purification device generally suffer from low purification efficiency.

Therefore, to address at least one aspect of the above problems and defects in the existing technology, an embodiment of the present disclosure provides a plasma purification device for purifying catering oil fume and a method for purifying catering oil fume, which is desired to control both the oil fume particulate matter and VOCs in the catering oil fume.

According to one aspect of the present disclosure, a plasma purification device for purifying catering oil fume is provided, wherein the plasma purification device successively includes in a flowing direction of airflow:
an inlet;
a rotary discharge module configured to negatively charge oil fume particulate matter with a particle size between 2 μm and 50 μm in the catering oil fume;
an electrostatic adsorption module configured to capture negatively charged oil fume particulate matter;
a back corona catalytic module configured to treat VOCs in the catering oil fume; and
an outlet,
wherein the rotary discharge module includes a central rod arranged parallel to the flow direction of airflow and a plurality of barbed corona electrodes arranged around the central rod, the central rod can rotate and drive the barbed corona electrodes to rotate, and the barbed corona electrodes after being energized negatively charge the oil fume particulate matter in the catering oil fume.

According to another aspect of the present disclosure, a method for purifying catering oil fume is provided, employing the plasma purification device for purifying catering oil fume as described in the above embodiment for purification, and including:
negatively charging the oil fume particulate matter with a particle size between 2 μm to 50 μm in the catering oil fume entering the plasma purification device by the barbed corona electrode in the rotary discharge module;
capturing the negatively charged oil fume particulate matter by the electrostatic adsorption module; and
treating the VOCs in the catering oil fume by the back corona catalytic module.

From the descriptions of the embodiments of the present disclosure with reference to the drawings below, other objectives and advantages of the present disclosure will become apparent, and will aid in a comprehensive understanding of the present disclosure.

BRIEF DESCRIPTION OF THE DRAWINGS

These and/or other aspects and advantages of the present disclosure will become apparent and comprehensible from the following description of preferred embodiments in conjunction with the accompanying drawings, wherein.

DETAILED DESCRIPTION OF EXEMPLARY EMBODIMENTS

Figure 1:
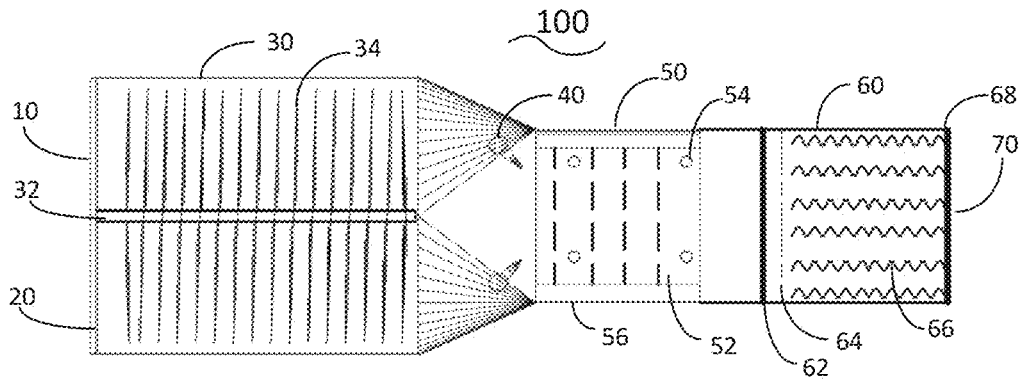
FIG. 1 illustrates a plasma purification device according to an embodiment of the present disclosure.

The technical solution of the present disclosure will be further specifically explained below by embodiments and in conjunction with the accompanying drawings. In the specification, the same or similar reference numbers indicate the same or similar components. The description of the embodiments of the present disclosure with reference to the drawings intends to explain the general inventive concept of the present disclosure and should not be understood as a limitation to the present disclosure.

Furthermore, in the detailed description below, in order for explanation, many specific details are set forth to provide a comprehensive understanding of the disclosed embodiments. However, it is apparent that one or more embodiments can be implemented without these specific details.

According to the general concept of the present disclosure, a plasma purification device for purifying catering oil fume is provided, which successively includes in a flowing direction of airflow: an inlet; a rotary discharge module configured to negatively charge oil fume particulate matter with a particle size between 2 μm and 50 μm in the catering oil fume; an electrostatic adsorption module configured to capture negatively charged oil fume particulate matter; a back corona catalytic module configured to treat VOCs in the catering oil fume; and an outlet, wherein the rotary discharge module includes a central rod arranged parallel to the flow direction of airflow and a plurality of barbed corona electrodes arranged around the central rod, the central rod can rotate and drive the barbed corona electrodes to rotate, and the barbed corona electrodes after being energized negatively charge the oil fume particulate matter in the catering oil fume.

In the plasma purification device of this embodiment of the present disclosure, after the barbed corona electrode in the rotary discharge module is energized, a tip discharge occurs, so that the surrounding gas is negatively charged, resulting in that the oil fume particulate matter in the catering oil fume with a particle size between 2 μm to 50 μm is negatively charged in order to allowing it to be captured by the electrostatic adsorption module; furthermore, the central rod and the barbed corona electrode in the rotary discharge module can rotate at high speeds to produce centrifugal force, which causes the oil fume particulate matter deposited on the central rod and/or barbed corona electrodes to leave the central rod and/or barbed corona electrode, thereby allowing more oil fume particulate matter to be captured by the electrostatic adsorption module, and improving treating efficiency.

In the plasma purification device of this embodiment of the present disclosure, the back corona catalytic module can treat VOCs in catering oil fume, for instance, oxidizing the VOCs into carbon dioxide and water, addressing the issue of secondary pollution caused by VOCs emissions.

Moreover, in the plasma purification device of the embodiment of the present disclosure, the various modules are organized in such a way that it achieves coordinated control of oil fume particulate matter and VOCs, multiple pollutants in catering oil fumes, which has the advantages such as a simple structure, assembly modularization, easy operation, low energy consumption, long service life, and others.

FIG. 1 illustrates a plasma purification device 100 according to an embodiment of the present disclosure. As shown in FIG. 1, the plasma purification device 100 includes, successively in a flowing direction of airflow (the airflow flows from left to right in FIG. 1), an inlet 10, a rotary discharge module 30, an electrostatic adsorption module 50, a back corona catalytic module 60, and an outlet 70. Optionally, the plasma purification device 100 can also be provided with a housing as required.

The inlet 10 allows the catering oil fume to enter the plasma purification device 100. In an example, the inlet 10 is located at a left end of the housing.

The rotary discharge module 30 negatively charges the oil fume particulate matter in the catering oil fume that has a particle size between 2 μm to 50 μm. Oil fume particulate matter with a particle size between 0.01 μm to 2 μm is difficult to be charged due to its small particle size.

The rotary discharge module 30 includes a central rod 32 and a plurality of barbed corona electrodes 34. The central rod 32 is arranged parallel to the flow direction of airflow. The plurality of barbed corona electrodes 34 are arranged around the central rod 32. Upon being energized, the barbed corona electrodes 34 produce a tip discharge, causing the gas to be negatively charged. For example, a direct high voltage can be applied to the central rod 32, and then the barbed corona electrodes 34 are energized or electrified, leading to a discharge at tips of the barbed corona electrodes 34.

The central rod 32 can rotate, and drive the barbed corona electrode 34 to rotate, thereby generating centrifugal force in the rotary discharge module 30. The centrifugal force can remove the oil fume particulate matter deposited on the central rod 32 and the barbed corona electrode 34, enabling more oil fume particulate matter to be adsorbed by the electrostatic adsorption module 50, improving treating efficiency. For example, the central rod 32 can be rotated by a rotary motor, causing the barbed corona motor 34 to rotate.

The electrostatic adsorption module 50 captures the negatively charged oil fume particulate matter, thereby preventing it to deposit in the back corona catalytic module 60, so as not to affect the treating efficiency of VOCs.

The back corona catalytic module 60 treats VOCs in the catering oil fume, which addresses the secondary pollution problem caused by the emission of catering oil fume.

The outlet 70 allows the catering oil fume to leave the plasma purification device 100, for instance, discharging them into the atmosphere. In an example, the outlet 70 is situated at a right end of the housing.

Optionally, the plasma purification device 100 is provided with an airflow distribution plate 20 between the inlet 10 and the rotary discharge module 30. The airflow distribution plate 20 is used to guide flow to evenly distribute within the plasma purification device 100, after the catering oil fume entering the plasma purification device 100.

In an example, the plurality of barbed corona electrodes 34 are arranged around the central rod 32 in a predetermined pattern.

Specifically, the predetermined pattern includes cylinder, single helix, double helix, serpentine, or cone. Alternatively, the predetermined pattern includes a plurality of rings arranged at intervals, with each ring having a plurality of barbed corona electrodes 34 arranged at intervals, as a result that the barbed corona electrodes 34 can be more evenly distributed from the left to the right end of the central rod 32. The embodiments of the present disclosure are not limited to this, and those skilled in the art can design the shape of the predetermined pattern as needed.

In an example, in a cross-section of the predetermined pattern, the distance from the barb of the barbed corona electrode 34 to the central rod 32 is arranged according to a predetermined rule. The predetermined rule may be that the distance from the barb to the central rod is different. For example, the distance from the barb to the central rod 32 can be arranged in the predetermined rule of an alternating long-short pattern (optionally, the short distance could be half of the long distance). For another example, the distance from the barb to the central rod 32 can be arranged in the predetermined rule of a wave-like pattern. The distance from the barb of the barbed corona electrode to the central rod is arranged in a wave or cone with the distance decreasing from left to right and then gradually increasing. When the barbed corona electrode 34 rotates (e.g., at 50-200 rpm), the barbs with different lengths assist in forming vortices in the rotary discharge area. The vortices can, on one hand, increase the probability of charging the catering oil fume particulate matter and, on the other hand, cause smaller catering oil fume particulate matter to adhere to each other, forming larger catering oil fume particulate matter. Under the influence of the above two aspects, the purification efficiency on the catering oil fume particulate matter can be significantly enhanced.

In an example, in the cross-section of the predetermined pattern, the barb of the barbed corona electrode 34 is formed with a predetermined angle to an axial line of the central rod 32. For example, the barb is inclined to the axial line of the central rod 32, specifically at 10-80° (e.g., 30-60°), or 100-170° (e.g., 120-150°). Exemplarily, the cross-section of the predetermined pattern is a fishbone shape. When the barbed corona electrode 34 rotates, the inclined barb assists in forming vortices in the rotary discharge area. The vortices can, on one hand, increase the probability of charging the catering oil fume particulate matter, on the other hand, cause smaller catering oil fume particulate matter to adhere to each other, forming larger catering oil fume particulate matter. Under the influence of the above two aspects, the purification efficiency on the catering oil fume particulate matter can be significantly enhanced.

In an alternative example, when the predetermined pattern is cone, the centrifugal force produced by the barbed corona electrode 34 at the base of the cone is greater than that produced by the barbed corona electrode 34 at the tip of the cone. The barbed corona electrode 34 can be positioned so that the tip of the cone is closer to the inlet than the base of the cone, ensuring a less amount of particulate pollutants in the airflow enter the electrostatic adsorption module 50.

In an example, the barbed corona electrode 34 is made of at least one of pig bristle, nylon wire, steel wire, and copper wire; and the central rod 32 is made of at least one of iron wire and stainless steel wire. Thus, compared to the rotary discharge module made of tungsten wire, the embodiment of the present disclosure can achieve a much lower cost.

In an example, the length of the barbed corona electrode 34 is determined by the height of the inner wall of the housing. For example, the length of the barbed corona electrode 34 can be no less than ¼ of the height of the inner wall, that is, it is preferable for the barbed corona electrode 34 to occupy at least half of the cavity of the housing. Those skilled in the art can set it as needed.

In an embodiment of the present disclosure, the electrostatic adsorption module 50 includes an adsorption electrode plate 52, a connecting rod 54, and a plate frame 56. One end of the adsorption electrode plate 52 is connected to the connecting rod 54, while the other end thereof is connected to the bottom of the plate frame 56. The electrostatic adsorption module 50 is powered by a positive high voltage direct current (DC) source, making the adsorption electrode plate 52 positively charged. When negatively charged oil fume particulate matter reach the adsorption electrode plate 52, the oil fume particulate matter are adsorbed onto it due to Coulomb force, preventing the oil fume particulate matter from reaching the subsequent back corona catalyst module.

Optionally, the plasma purification device 100 is also provided with an automatic cleaning module 40 between the rotary discharge module 30 and the electrostatic adsorption module 50. The automatic cleaning module 40 can remove the oil fume particulate matter captured on the surface of the electrostatic adsorption module 50.

The automatic cleaning module 40 includes at least one nozzle positioned on the inner wall of the plasma purification device 100. For example, the plasma purification device 100 includes one, two, three, four, or more nozzles. The at least one nozzle sprays cleaning liquid at a speed of 2-10 m/s (e.g., 5-8 m/s). In an example, the plasma purification device includes four nozzles respectively positioned at four corners near an entrance of the electrostatic adsorption module 50, and each nozzle can rotate 360° to spray it to every position of the adsorption plate as possible as it can. Those skilled in the art can choose the cleaning liquid and its amount as needed.

In an embodiment of the present disclosure, the back corona catalyst module 60 successively includes, in the flow direction of airflow: a corona electrode 62, an auxiliary electrode 64, an integral VOCs catalyst 66, and a grounding electrode 68. The corona electrode 62 and the auxiliary electrode 64 are powered by two negative high voltage DC sources, respectively.

During the discharge process, the corona electrode 62 ionizes the gas next to the corona electrode 62 to produce a large number of negative charges, and the negative charges can interact with the integral VOCs catalyst 66 to form back corona plasma. The corona electrode 62 can be made of tungsten wires with a diameter between 2-6 mm.

The auxiliary electrode 64 suppresses the transition of discharge of the corona electrode 62 into a spark discharge. The auxiliary electrode 64 can be made of tungsten wires with a diameter between 2-6 mm.

The integral VOCs catalyst 66 includes a honeycomb-shaped substrate and a VOCs catalyst coated on both the inner and outer surfaces of the honeycomb-shaped substrate. The honeycomb-shaped substrate of the integral VOCs catalyst 66 is made from cordierite, foamed metal (nickel), alumina, or silicon carbide. Both the inner and outer surfaces of the honeycomb-shaped substrate have whiskers. The whiskers on the inner and outer surfaces of the honeycomb-shaped substrate include mullite whiskers, boron nitride whiskers, or silicon carbide whiskers.

The integral VOCs catalyst is prepared by coating the VOCs catalyst on both the inner and outer surfaces of the honeycomb-shaped substrate and then undergoing drying and baking processes.

In an embodiment of the present disclosure, during the discharge process, the corona electrode 62 ionizes the gas next to the corona electrode 62 to produce a large number of negative charges that accumulate on both the inner and outer surfaces of the integral VOCs catalyst 66; the accumulated charges create an overlaying electric field in the inner pores of the honeycomb-shaped substrate, when the field strength of the overlaying electric field reaches or exceeds the breakdown field strength of the whiskers on the surface of the inner pores of the honeycomb-shaped substrate, back corona plasma is generated. Under the action of the back corona plasma, charged oil fume particulate matter is reversely reflected and captured by the electrostatic adsorption module 50, to prevent the deposition of the oil fume particulate matter on the surface of the VOCs catalyst, thereby preventing deactivation of catalyst due to poisoning and extending the life span of the catalyst. At the same time, the back corona plasma is generated in the inner pores of the honeycomb-shaped substrate, forming plasma reaction channels, within which free electrons, high-energy ions, and active particles interact with N2 and O2 to produce ·N, ·O, and ·OH active radicals; ·N, ·O, and ·OH active radicals closely bind with the active components (such as Ce and Cu) of the VOCs catalyst on both the inner and outer surfaces of the integral VOCs catalyst 66, leveraging the high reactivity of the plasma and the high selectivity of the VOCs for reactions, activating the reactivity of the VOCs catalyst, enhancing the selectivity of the back corona plasma for reactions, promoting VOCs reactions at ambient or low temperature, and ultimately oxidizing VOCs in the catering oil fumes into H2O and O2. The auxiliary electrode 64 suppresses the transition of the discharge of corona electrode 62 into a spark discharge. The purified catering oil fumes are expelled from the outlet 70 of the plasma purification device 100.

Below, three specific examples will be provided to elaborate on the integral VOCs catalyst on the integral VOCs catalyst 66, its preparation method, and the corresponding fume treatment process.

The preparation method of the integral VOCs catalyst 66 includes: providing whisker raw material, anhydrous aluminum sulfate, anhydrous sodium sulfate and a honeycomb-shaped substrate in a predetermined proportion, and embedding the honeycomb-shaped substrate with the whisker raw material, the anhydrous aluminum sulfate, and the anhydrous sodium sulfate to obtain a mixed material; baking the mixed material at 900-1200° C. for 2-12 hours and then cooling it to grow whiskers on the surface of the honeycomb-shaped substrate; providing VOCs catalyst powder and mixing the VOCs catalyst powder with sodium carboxymethyl cellulose, silica sol, and water in a predetermined proportion to obtain a VOCs catalyst slurry; and coating the VOCs catalyst slurry on both inner and outer surfaces of the honeycomb-shaped substrate, and baking it after drying to obtain the integral VOCs catalyst.

Since the honeycomb-shaped substrate has the whiskers grown on the inner and outer surfaces, the honeycomb-shaped substrate has a larger specific surface area, so that it can offer more adhesion sites for the VOCs catalyst coating. Dense whiskers on the inner and outer surfaces of the honeycomb-shaped substrate can improve the interception and purification efficiency of oil fume particulate matter. Moreover, during the discharge process, a large number of negative charges are produced and accumulated on the inner and outer surfaces of the integral VOCs catalyst, the accumulated charges create an overlaying electric field in the inner pores of the honeycomb-shaped substrate, and when the field strength of the overlaying electric field reaches or exceeds the breakdown field strength of the whiskers on the surface of the inner pores of the honeycomb-shaped substrate, back corona plasma is generated.

The preparation method of the integral VOCs catalyst includes:

obtaining the mixed material: providing the whisker raw material, the anhydrous aluminum sulfate, the anhydrous sodium sulfate and the honeycomb-shaped substrate (including cordierite, alumina, foamed metal (such as nickel), or silicon carbide) in a predetermined proportion, and embedding the honeycomb-shaped substrate with the whisker raw material, anhydrous aluminum sulfate, and anhydrous sodium sulfate to obtain the mixed material;

growing the whiskers: baking the mixed material at 900-1200° C., preferably at 1000-1100° C., for 2-12 hours (preferably 4-10 hours, more preferably 6 hours), then cooling it (preferably to room temperature) to grow whiskers on the surface of the honeycomb-shaped substrate;

obtaining the VOCs catalyst slurry: providing VOCs catalyst powder and mixing the VOCs catalyst powder with sodium carboxymethyl cellulose, silica sol, and water in a predetermined proportion to obtain the VOCs catalyst slurry; and obtaining the integral VOCs catalyst: coating the VOCs catalyst slurry on the inner and outer surfaces of the honeycomb-shaped substrate with the grown whispers, and baking it after drying to obtain the integral VOCs catalyst.

In an embodiment, obtaining the VOCs catalyst powder includes steps of: dissolving cerium oxalate hydrate, copper citrate, manganese acetate, and titanium dioxide in deionized water in a mass ratio of (2-10):(5-15):(1-4):(75-85), mixing and stirring in a water bath (preferably at 40-80° C., more preferably 55° C.) for 1-3 hours (preferably 2 hours), after drying, baking at 300-600° C. (e.g.) 500° ° C. for 2-8 hours (e.g., 6 hours) to obtain the VOCs catalyst powder. For example, the mass ratio of cerium oxalate hydrate, copper citrate, manganese acetate, and titanium dioxide can be 6:10:2:82. In an embodiment, it can be dried in a drying oven at 80-120° C. (preferably 100° C.) for 8-24 hours (preferably 12 hours). In an embodiment, it can be baked in a muffle furnace at 400-500° C. (preferably 450° C.) for 4-6 hours (preferably 5 hours).

In an embodiment, obtaining the VOCs catalyst slurry includes steps of: uniformly mixing the VOCs catalyst powder with sodium carboxymethyl cellulose, silica sol, and water in a mass ratio of (20-40):(10-30):(10-20):(20-40) to obtain the VOCs catalyst slurry. For example, the mass ratio of VOCs catalyst powder, sodium carboxymethyl cellulose, silica sol, and water can be 40:15:13:32.

In an embodiment, obtaining the integral VOCs catalyst includes steps of: coating the VOCs catalyst slurry on the inner and outer surfaces of the honeycomb-shaped substrate with the grown whispers using a vacuum coater, after drying the coated material, baking it at 300-600° C. for 2-10 hours to obtain the integral VOCs catalyst. In an embodiment, it can be dried in a drying oven at 80-120° C. (preferably 100° C.) for 1-4 hours (preferably 2 hours). In an embodiment, it can be baked in a muffle furnace at 400-500° C. (preferably 450° C.) for 4-8 hours (preferably 6 hours).

In an embodiment, the method of the present disclosure can grow mullite whiskers, aluminum borate whiskers, or silicon carbide whiskers.

In an embodiment, when growing mullite whiskers, the whisker raw material is obtained by following steps: dissolving the organic silicon source in an organic solvent to form a silica sol, and treating the silica sol in a water bath at 40-80° C. (preferably 60° C.) for 0.5-5 hours (preferably 1-4 hours, more preferably 2 hours); dissolving the inorganic aluminum salt in an inorganic solvent to form an inorganic aluminum salt solution; adding the inorganic aluminum salt solution to the silica sol treated in a water bath to form a silicon-aluminum mixed sol; treating the silicon-aluminum mixed sol in a water bath at 40-80° C. (preferably 60° C.) for 6-18 hours (preferably 10-15 hours, more preferably 12 hours); and after drying, for example, in an oven (preferably 80-100° C., more preferably) 90° ° C., grinding it to obtain silicon-aluminum gel powder, which is the whisker raw material.

In an embodiment, the organic silicon source is at least one of tetraethyl orthosilicate, tetramethyl orthosilicate, and tetrapropyl orthosilicate. In an embodiment, the inorganic aluminum salt is at least one of aluminum nitrate, aluminum nitrate nonahydrate, aluminum chloride, basic aluminum chloride, and aluminum sulfate. In an embodiment, the inorganic solvent is deionized water. In an embodiment, the organic solvent is anhydrous ethanol. In an embodiment, the molar ratio of aluminum to silicon in the silicon-aluminum mixed sol is between 2:1-6:1, preferably 3:1-4:1. In an embodiment, the mass ratio of the honeycomb-shaped substrate:silicon-aluminum gel powder:anhydrous aluminum sulfate:anhydrous sodium sulfate is (40-50):(15-25):(15-25):(10-20), for example, 40:25:20:15.

In an embodiment, an additive is added, for example, under stirring conditions, to promote the hydrolysis of the organic silicon source to form silica sol, and the additive is 2-4 ml of ammonia water.

In an embodiment, when growing alumina borate whiskers, the whisker raw material includes boric anhydride and aluminum nitrate. In an embodiment, the mass ratio of honeycomb-shaped substrate:boric anhydride:aluminum nitrate:anhydrous aluminum sulfate:anhydrous sodium sulfate is (20-40):(10-20):(10-20):(10-20):(20-30), for example, 30:15:20:15:20.

In an embodiment, when growing the silicon carbide whiskers, the whisker raw material is obtained by following steps: mixing silicon powder and a carbon source at a Si:C molar ratio of 1:1 and placing it into a microwave heating device (preferably a microwave sintering furnace), and obtaining silicon carbide powder through microwave heating. In an embodiment, during the microwave heating process, the microwave frequency is set at 2-3 GHZ (preferably 2.5 GHZ), and the microwave source power is set at 3-5 kw (preferably 4 kw). In an embodiment, the carbon source is at least one of carbon black, petroleum coke, graphite powder, and activated carbon. In an embodiment, the mass ratio of the honeycomb-shaped substrate:silicon carbide powder: anhydrous aluminum sulfate:anhydrous sodium sulfate is (30-40):(20-30):(15-25):(10-30), for example, 30:20:22:28.

Figure 2:
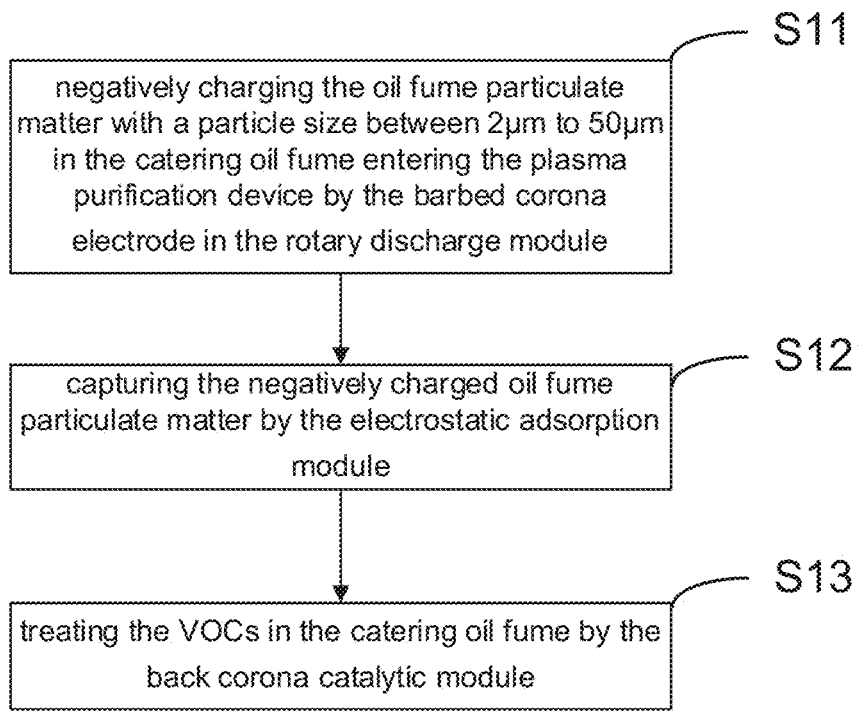
FIG. 2 illustrates a method for purifying catering oil fume according to an embodiment of the present disclosure.

According to another concept of the present disclosure, a method for purifying catering oil fume is also provided. As shown in FIG. 2, the method includes:
by the barbed corona electrode 34 in the rotary discharge module 30, the oil fume particulate matter with a particle size between 2 μm to 50 μm in the catering oil fume entering the plasma purification device 100 is negatively charged. Since the negative high voltage DC power supply powers the barbed corona electrode 34, the surrounding gas thereof is ionized to generate a large number of negative charges, and the oil fume particulate matter with a particle size between 2-50 μm in the catering oil fume is negatively charged under the negative DC corona effect.

The negatively charged oil fume particulate matter is captured by the electrostatic adsorption module 50. Since a positive high-voltage DC power supply powers the electrostatic adsorption module 50 (e.g., adsorption electrode plate), a positive charged electric field is formed in the electrostatic adsorption module 50, and under the attraction of the electric field force, the negatively charged oil fume particulate matter is adsorbed by the electrostatic adsorption module 50.

The VOCs in the catering oil fume is treated by the back corona catalytic module 60. The back corona catalytic module 60 can use the active components in its generated plasma to oxidize VOCs, so as to remove VOCs.

The method of the embodiment of the present disclosure treats oil fume particulate matter in the catering oil fume by the rotary discharge module 30 and the electrostatic adsorption module 50 and effectively treats VOCs (e.g., oxidizing them into water and carbon dioxide) by the back corona catalytic module 60, thereby achieving efficient treatment of the catering oil fume without the issue of secondary pollution.

In an example, after the catering oil fume (e.g., through the inlet 10) enters the plasma purification device 100, the catering oil fume is evenly distributed inside the plasma purification device 100 under the flow guide of the airflow distribution plate 20, which helps efficiently treat the catering oil fume.

In an example, by the automatic cleaning module 40, the electrostatic adsorption module 50 is rotated and rinsed regularly (e.g., timed) to remove the oil fume particulate matter deposited on the surface of the electrostatic adsorption module 50, preventing the electrostatic adsorption module 50 from adsorption saturation and reducing efficiency.

The following provides specific examples for a better understanding of the present disclosure, it is appreciated by those skilled in the art that the following embodiments are only part of all embodiments of the present disclosure, and due to concise reasons, not all embodiments are listed.

Embodiment 1

(1) Producing an Integrated VOCs Catalyst by the Honeycomb-Shaped Substrate with Grown Mullite Whiskers A sol-gel method is used to produce the silica-alumina gel powder. A certain amount of aluminum nitrate is weighed and dissolved in deionized water, and a certain amount of ethyl silicate is weighed and dissolved in anhydrous ethanol, and the Al/Si molar ratio is set between 3.5:1; 2-4 ml of ammonia water is added to the anhydrous ethanol solution under stirring to catalyze the hydrolysis of ethyl silicate to form a silica sol, and treated in a 60° C. water bath for 2 hours; then, the aluminum nitrate solution is added to the silica sol under stirring and treated in a 60° C. water bath for 12 hours, the silica-alumina mixed sol is dried in an oven at 90° C. and then ground to obtain the silica-alumina gel powder.

A certain amount of hexadecahydrate aluminum sulfate or octadecahydrate aluminum sulfate is weighed and heated to 400° C. to remove the crystalline water to obtain anhydrous aluminum sulfate, and then a certain amount of anhydrous aluminum sulfate and anhydrous sodium sulfate are weighed as a composite molten salt system.

The silicon-aluminum gel powder, anhydrous aluminum sulfate, and anhydrous sodium sulfate are added to the cordierite, alumina, foamed metal (nickel), or silicon carbide honeycomb-shaped substrate, with the mass ratio of cordierite, alumina, foamed metal (nickel), or silicon carbide honeycomb-shaped substrate:silicon-aluminum gel powder:anhydrous aluminum sulfate:anhydrous sodium sulfate being 45:19:20:16, and the cordierite, alumina, foamed metal (nickel), or silicon carbide honeycomb-shaped substrate is at least partially, and preferably fully, embedded by the silicon-aluminum gel powder, anhydrous aluminum sulfate, and anhydrous sodium sulfate. The mixed material is placed in a muffle furnace and baked at 900-1200° C. for 6 hours. After naturally cooled to room temperature, dense mullite whiskers are grown on the surface of the cordierite, alumina, foamed metal (nickel), or silicon carbide honeycomb-shaped substrate.

A certain amount of cerium oxalate hydrate, copper citrate, manganese acetate, and titanium dioxide are weighed and dissolved in deionized water in a mass ratio of 6:10:2:82, mixed and stirred at 60° C. in a water bath for 2 hours, dried at 100° C. for 12 hours, and baked at 450° C. for 5 hours to obtain VOCs catalyst powder.

The VOCs catalyst powder is mixed uniformly with sodium carboxymethyl cellulose, silica sol, and water in a mass ratio of 25:20:16:39 to obtain a VOCs catalyst slurry. The VOCs catalyst slurry is coated on the cordierite, alumina, foamed metal (nickel), or silicon carbide honeycomb-shaped substrate on the surface of which mullite whiskers are grown using a vacuum coater. The coated material is placed in a drying oven and dried at 100° C. for 2 hours, and subsequently placed in a muffle furnace and baked at 450° ° C. for 6 hours.

(2) Purifying Exhaust Gas

The catering oil fume collected through the pipeline enters the plasma purification device 100 through the inlet 10. Under the flow guide of the airflow distribution plate 20, the catering oil fume is evenly distributed inside the plasma purification device 100 and sequentially passes through the rotary discharge module 30, the automatic cleaning module 40, the electrostatic adsorption module 50, and the back corona catalytic module 60.

When passing through the rotary discharge module 30, because the negative high-voltage DC power supply powers the corona electrode 62, a large number of negative charges are generated by ionizing the gas next to the corona electrode 32. The oil fume particulate matters in the catering oil fumes with a particle size between 2 μm to 50 μm are negatively charged under the influence of the negative DC corona, while oil fume particulate matters with a particle size between 0.01 μm to 2 μm are difficult to be charged.

The automatic cleaning module 40 can regularly rotate and rinse the electrostatic adsorption module 50 to remove the oil fume particulate matter deposited on the surface of the electrostatic adsorption module 50.

When passing through the back corona catalytic module 60, the corona electrode 62 and the auxiliary electrode 64 in the back corona catalytic module 60 are respectively powered by two negative high voltage DC power supplies. During the discharge process, the corona electrode 62 causes the gas next to the corona electrode 62 to be ionized, producing a large number of negative charges which accumulate on the inner and outer surfaces of the integral VOCs catalyst 66. The accumulated charges create an overlaying electric field in the inner pores of the honeycomb-shaped substrate, when the field strength of the overlaying electric field reaches or exceeds the breakdown field strength of the whiskers on the surface of the inner pores of the honeycomb-shaped substrate, a back corona plasma is generated. Under the influence of the back corona plasma, charged oil fume particulate matter is reversely reflected and captured by the electrostatic adsorption module 50, to prevent the deposition of oil fume particulate matter on the surface of the VOCs catalyst and thereby preventing the deactivation of the VOCs catalyst due to poisoning, and extending its service life. At the same time, the back corona plasma is generated in the inner pores of the honeycomb-shaped substrate, forming plasma reaction channels. Free electrons, high-energy ions, and active particles, generated in the plasma reaction channel, interact with VOCs to produce H2O and O2. The high-energy ions and active particles are bond closely with the active components of the VOCs catalyst on the inner and outer surfaces of the integral VOCs catalyst 66. This enables to fully utilize both advantages of the high reactivity of the plasma and the high selectivity of VOCs reactions, activate the reactive activity of the VOCs catalyst, enhance the selectivity of the back corona plasma reaction, and promote VOCs reactions at ambient or low temperatures. Finally, VOCs in the catering oil fume are oxidized to H2O and O2. The auxiliary electrode 64 suppresses the transition of the discharge of corona electrode 62 to a spark discharge. The purified catering fumes are then expelled from the outlet 70 of the plasma purification device 100.

Embodiment 2

(1) Producing an Integral VOCs Catalyst by a Honeycomb-Shaped Substrate with Grown Boron-Aluminum Whiskers A certain amount of hexadecahydrate aluminum sulfate or octadecahydrate aluminum sulfate is weighed and heated to 400° C. to remove the crystalline water to obtain anhydrous aluminum sulfate. Then, a certain amount of anhydrous aluminum sulfate and anhydrous sodium sulfate are weighed as a composite molten salt system.

Boron trioxide, aluminum nitrate, anhydrous aluminum sulfate, and anhydrous sodium sulfate are added to cordierite, alumina, foamed metal (nickel), or silicon carbide honeycomb-shaped substrate, with the mass ratio of cordierite, alumina, foamed metal (nickel), or silicon carbide honeycomb-shaped substrate: boron trioxide:aluminum nitrate: anhydrous aluminum sulfate:anhydrous sodium sulfate being 30:15:15:15:25, and the cordierite, alumina, foamed metal (nickel), or silicon carbide honeycomb-shaped substrate is at least partially, and preferably fully, embedded by the boron trioxide, aluminum nitrate, anhydrous aluminum sulfate, and anhydrous sodium sulfate. The mixed material is placed in a muffle furnace and baked at 1100° C. for 6 hours. After naturally cooling to room temperature, dense boron-aluminum whiskers are grown on the surface of the cordierite, alumina, foamed metal (nickel), or silicon carbide honeycomb-shaped substrate.

A certain amount of cerium oxalate hydrate, copper citrate, manganese acetate, and titanium dioxide are dissolved in deionized water in a mass ratio of 6:10:2:82, mixed and stirred in a water bath at 60° C. for 2 hours, dried at 100° C. for 12 hours, and then baked at 450° C. for 5 hours to obtain a VOCs catalyst powder.

The VOCs catalyst powder is mixed uniformly with sodium carboxymethyl cellulose, silica sol, and water in a mass ratio of 25:20:16:39 to obtain a VOCs catalyst slurry. The VOCs catalyst slurry is coated on the cordierite, alumina, foamed metal (nickel), or silicon carbide honeycomb-shaped substrate on the surface of which boron-aluminum whiskers are grown using a vacuum coater. The coated material is placed in a drying oven and dried at 100° C. for 2 hours, and subsequently placed in a muffle furnace and baked at 450° C. for 6 hours.

(2) Purifying Exhaust Gas

The catering oil fume collected through the pipeline enters the plasma purification device 100 through the inlet 10. Under the flow guide of the airflow distributor plate 20, the catering oil fume is uniformly distributed inside the plasma purification device 100 and sequentially passes through the rotary discharge module 30, the automatic cleaning module 40, the electrostatic adsorption module 50, and the back corona catalytic module 60.

When passing through the rotary discharge module 30, because the negative high-voltage DC power supply powers the corona electrode 62, a large number of negative charges are generated by ionizing the gas next to the corona electrode 32. The oil fume particulate matters in the catering oil fumes with a particle size between 2 μm to 50 μm are negatively charged under the influence of the negative DC corona, while oil fume particulate matters with a particle size between 0.01 μm to 2 μm are difficult to be charged.

The automatic cleaning module 40 can regularly rotate and rinse the electrostatic adsorption module 50 to remove the oil fume particulate matter deposited on the surface of the electrostatic adsorption module 50.

When passing through the back corona catalytic module 60, the corona electrode 62 and the auxiliary electrode 64 in the back corona catalytic module 60 are respectively powered by two negative high voltage DC power supplies. During the discharge process, the corona electrode 62 causes the gas next to the corona electrode 62 to be ionized, producing a large number of negative charges which accumulate on the inner and outer surfaces of the integral VOCs catalyst 66. The accumulated charges create an overlaying electric field in the inner pores of the honeycomb-shaped substrate, when the field strength of the overlaying electric field reaches or exceeds the breakdown field strength of the whiskers on the surface of the inner pores of the honeycomb-shaped substrate, a back corona plasma is generated. Under the influence of the back corona plasma, charged oil fume particulate matter is reversely reflected and captured by the electrostatic adsorption module 50, to prevent the deposition of oil fume particulate matter on the surface of the VOCs catalyst and thereby preventing the deactivation of the VOCs catalyst due to poisoning, and extending its service life. At the same time, the back corona plasma is generated in the inner pores of the honeycomb-shaped substrate, forming plasma reaction channels. Free electrons, high-energy ions, and active particles, generated in the plasma reaction channel, interact with VOCs to produce H2O and O2. The high-energy ions and active particles are bond closely with the active components of the VOCs catalyst on the inner and outer surfaces of the integral VOCs catalyst 66. This enables to fully utilize both advantages of the high reactivity of the plasma and the high selectivity of VOCs reactions, activate the reactive activity of the VOCs catalyst, enhance the selectivity of the back corona plasma reaction, and promote VOCs reactions at ambient or low temperatures. Finally, VOCs in the catering oil fume are oxidized to H2O and O2. The auxiliary electrode 64 suppresses the transition of the discharge of corona electrode 62 to a spark discharge. The purified catering fumes are then expelled from the outlet 70 of the plasma purification device 100.

Embodiment 3

(1) Producing an Integral VOCs Catalyst by a Honeycomb-Shaped Substrate with Grown Silicon Carbide Whiskers A certain amount of carbon black and silicon powder are weighed in a Si:C molar ratio of 1:1, mixed evenly, and placed in a microwave sintering furnace with the microwave frequency of 2.45 GHz and the microwave source power of 4 kW, to obtain the silicon carbide powder.

A certain amount of hexadecahydrate aluminum sulfate or octadecahydrate aluminum sulfate is weighed and heated to 400° C. to remove crystalline water to obtain anhydrous aluminum sulfate, and then a certain amount of anhydrous aluminum sulfate and anhydrous sodium sulfate are weighed as a composite molten salt system.

Silicon carbide powder, anhydrous aluminum sulfate, and anhydrous sodium sulfate are added to cordierite, alumina, foamed metal (nickel), or silicon carbide honeycomb-shaped substrate, with the mass ratio of cordierite, alumina, foamed metal (nickel), or silicon carbide honeycomb-shaped substrate:silicon carbide powder:anhydrous aluminum sulfate: anhydrous sodium sulfate is 36:24:20:20, and the cordierite, alumina, foamed metal (nickel), or silicon carbide honeycomb-shaped substrate is at least partially, and preferably fully, embedded with the silicon carbide powder, anhydrous aluminum sulfate, and anhydrous sodium sulfate. The mixed material is placed in a muffle furnace and baked at 1100° C. for 6 hours. After naturally cooled to room temperature, dense silicon carbide whiskers are grown on the surface of the cordierite, alumina, foamed metal (nickel), or silicon carbide honeycomb-shaped substrate.

A certain amount of cerium oxalate hydrate, copper citrate, manganese acetate, and titanium dioxide are weighed and dissolved in deionized water in a mass ratio of 6:10:2: 82, mixed and stirred at 60° C. in a water bath for 2 hours, dried at 100° C. for 12 hours, and baked at 450° C. for 5 hours to obtain VOCs catalyst powder.

The VOCs catalyst powder is mixed uniformly with sodium carboxymethyl cellulose, silica sol, and water in a mass ratio of 25:20:15:40 to obtain a VOCs catalyst slurry. The VOCs catalyst slurry is coated on the cordierite, alumina, foamed metal (nickel), or silicon carbide honeycomb-shaped substrate on the surface of which silicon carbide whiskers are grown using a vacuum coater. The coated material is placed in a drying oven and dried at 100° C. for 2 hours, and subsequently placed in a muffle furnace and baked at 450° C. for 6 hours.

(2) Purifying Exhaust Gas

The catering oil fume collected through the pipeline enters the plasma purification device 100 through the inlet 10. Under the flow guide of the airflow distribution plate 20, the catering oil fume is evenly distributed inside the plasma purification device 100 and sequentially passes through the rotary discharge module 30, the automatic cleaning module 40, the electrostatic adsorption module 50, and the back corona catalytic module 60.

When passing through the rotary discharge module 30, because the negative high-voltage DC power supply powers the corona electrode 62, a large number of negative charges are generated by ionizing the gas next to the corona electrode 32. The oil fume particulate matters in the catering oil fumes with a particle size between 2 μm to 50 μm are negatively charged under the influence of the negative DC corona, while oil fume particulate matters with a particle size between 0.01 μm to 2 μm are difficult to be charged.

The automatic cleaning module 40 can regularly rotate and rinse the electrostatic adsorption module 50 to remove the oil fume particulate matter deposited on the surface of the electrostatic adsorption module 50.

When passing through the back corona catalytic module 60, the corona electrode 62 and the auxiliary electrode 64 in the back corona catalytic module 60 are respectively powered by two negative high voltage DC power supplies. During the discharge process, the corona electrode 62 causes the gas next to the corona electrode 62 to be ionized, producing a large number of negative charges which accumulate on the inner and outer surfaces of the integral VOCs catalyst 66. The accumulated charges create an overlaying electric field in the inner pores of the honeycomb-shaped substrate, when the field strength of the overlaying electric field reaches or exceeds the breakdown field strength of the whiskers on the surface of the inner pores of the honeycomb-shaped substrate, a back corona plasma is generated. Under the influence of the back corona plasma, charged oil fume particulate matter is reversely reflected and captured by the electrostatic adsorption module 50, to prevent the deposition of oil fume particulate matter on the surface of the VOCs catalyst, thereby preventing the deactivation of the VOCs catalyst due to poisoning, and extending its service life. At the same time, the back corona plasma is generated in the inner pores of the honeycomb-shaped substrate, forming plasma reaction channels. Free electrons, high-energy ions, and active particles, generated in the plasma reaction channel, interact with VOCs to produce H2O and O2. The high-energy ions and active particles are bond closely with the active components of the VOCs catalyst on the inner and outer surfaces of the integral VOCs catalyst 66. This enables to fully utilize both advantages of the high reactivity of the plasma and the high selectivity of VOCs reactions, activate the reactive activity of the VOCs catalyst, enhance the selectivity of the back corona plasma reaction, and promote VOCs reactions at ambient or low temperatures. Finally, VOCs in the catering oil fume are oxidized to H2O and O2. The auxiliary electrode 64 suppresses the transition of the discharge of corona electrode 62 to a spark discharge. The purified catering fumes are then expelled from the outlet 70 of the plasma purification device 100.

In summary, the plasma purification device and the method for purifying catering oil fume provided by the present disclosure have at least one of the following advantages:

In the plasma purification device according to the embodiment of the present disclosure, when the barbed corona electrode in the rotary discharge module is powered, a tip discharge occurs, so as to charge the surrounding gas negatively, making the oil fume particulate matters in the catering oil fumes with a particle size between 2 μm to 50 μm being negatively charged, thereby allowing them to be captured by the electrostatic adsorption module; moreover, the central rod and the barbed corona electrode in the rotary discharge module can rotate at high speeds to generate centrifugal force, which makes the oil fume particle matter deposited on the central rod and/or the barbed corona electrode to leave the central rod and/or the barbed corona electrode, allowing more oil fume particulate matter to be captured by the electrostatic adsorption module, thus improving treating efficiency.

During the discharge process, the corona electrode causes the gas next to the corona electrode to be ionized, producing a large number of negative charges which accumulate on the inner and outer surfaces of the integral VOCs catalyst. The accumulated charges create an overlaying electric field in the inner pores of the honeycomb-shaped substrate, when the field strength of the overlaying electric field reaches or exceeds the breakdown field strength of the whiskers on the surface of the inner pores of the honeycomb-shaped substrate, a back corona plasma is generated.

Under the influence of the back corona plasma, charged oil fume particulate matter is reversely reflected to prevent the deposition of oil fume particulate matter on the surface of the VOCs catalyst, thereby preventing the deactivation of the VOCs catalyst due to poisoning, and extending its service life.

The back corona plasma is generated in the inner pores of the honeycomb-shaped substrate, forming plasma reaction channels. Free electrons, high-energy ions, and active particles, generated in the plasma reaction channel, are bond closely with active components of the VOCs catalyst. This enables to fully utilize both advantages of the high reactivity of the plasma and the high selectivity of VOCs reactions, activate the reactive activity of the VOCs catalyst, enhance the selectivity of the back corona plasma reaction, and promote VOCs reactions at ambient or low temperatures.

The dense whiskers on the inner and outer surfaces of the honeycomb-shaped substrate enhance the interception, capture and purification efficiency for oil fume particulate matter.

The purification device has a simple structure, can be modularly assembled, occupies a small footprint, stop-and-play, and offers benefits such as ease of operation, high purification efficiency, low energy consumption, and no secondary pollution.

The above descriptions are merely preferred embodiments of the present disclosure and are not intended to limit the present disclosure. For those skilled in the art, various changes and modifications can be made to the present disclosure. Any modifications, equivalent replacements, improvements, etc., made within the spirit and principle of the present disclosure should be included within the protection scope of the present disclosure.

What is claimed is:

1. A plasma purification device for purifying catering oil fume, wherein the plasma purification device comprises successively in a flow direction of airflow:
   an inlet;
   a rotary discharge module configured to negatively charge oil fume particulate matter with a particle size between 2 μm and 50 μm in the catering oil fume;
   an electrostatic adsorption module configured to capture the negatively charged oil fume particulate matter;
   a back corona catalytic module configured to treat VOCs in the catering oil fume; and
   an outlet,
   wherein the rotary discharge module comprises a central rod arranged parallel to the flow direction of airflow and a plurality of barbed corona electrodes arranged around the central rod, the central rod can rotate and drive the barbed corona electrodes to rotate, and the barbed corona electrodes after being energized negatively charge the oil fume particulate matter in the catering oil fume,
   the plurality of barbed corona electrodes are arranged in a predetermined pattern around the central rod, in a cross-section of the predetermined pattern, the barb of the barbed corona electrode is arranged in a fishbone pattern with an axis of the central rod, with an angle ranging between 30 degrees to 60 degrees.

2. The plasma purification device according to claim 1, wherein,
   the barbed corona electrode is made of at least one of pig bristle, nylon wire, steel wire, and copper wire, and
   the central rod is made of at least one of iron wire and stainless steel wire.

3. The plasma purification device according to claim 2, wherein,
   the back corona catalytic module successively comprises in the flow direction of airflow: a corona electrode, an auxiliary electrode, an integral VOCs catalyst, and a grounding electrode, the corona electrode and the auxiliary electrode being powered by two negative high-voltage DC sources, respectively.

4. The plasma purification device according to claim 3, wherein,
   the integral VOCs catalyst comprises a honeycomb-shaped substrate and a VOCs catalyst coated on both inner and outer surfaces of the honeycomb-shaped substrate, the honeycomb-shaped substrate comprises whiskers on its inner and outer surfaces, and the integral VOCs catalyst is produced by coating the VOCs catalyst on both the inner and outer surfaces of the honeycomb-shaped substrate and then undergoing drying and baking processes.

5. The plasma purification device according to claim 2, further comprising:
   an automatic cleaning module arranged between the rotary discharge module and the electrostatic adsorption module, capable of removing the oil fume particulate matter captured on the surface of the electrostatic adsorption module, and comprising at least one nozzle arranged on an inner wall of the plasma purification device and configured to spray a cleaning fluid at a speed of 2-10 m/s; and
   an airflow distributor plate arranged between the inlet and the rotary discharge module.

6. A method for purifying catering oil fume, employing the plasma purification device for purifying catering oil fume according to claim 1 for purification, and the method comprising:
   negatively charging the oil fume particulate matter with a particle size between 2 μm to 50 μm in the catering oil fume entering the plasma purification device by the barbed corona electrode in the rotary discharge module;
   capturing the negatively charged oil fume particulate matter by the electrostatic adsorption module; and
   treating the VOCs in the catering oil fume by the back corona catalytic module.

\* \* \* \* \*